N. PIGEON.
Processes for Manufacturing Glucose.
No. 203,935. Patented May 21, 1878.
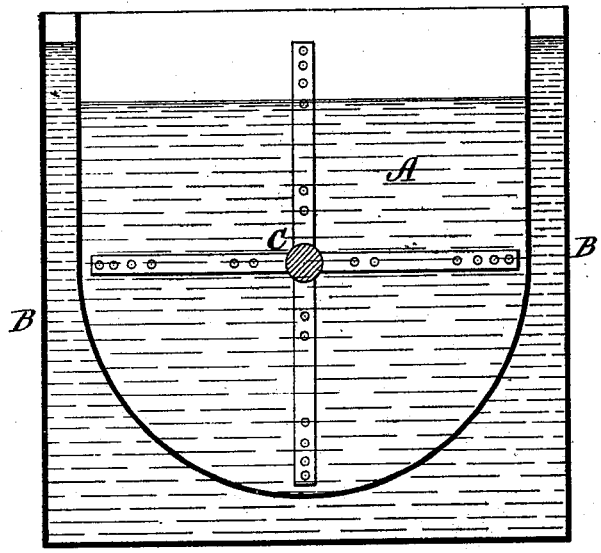
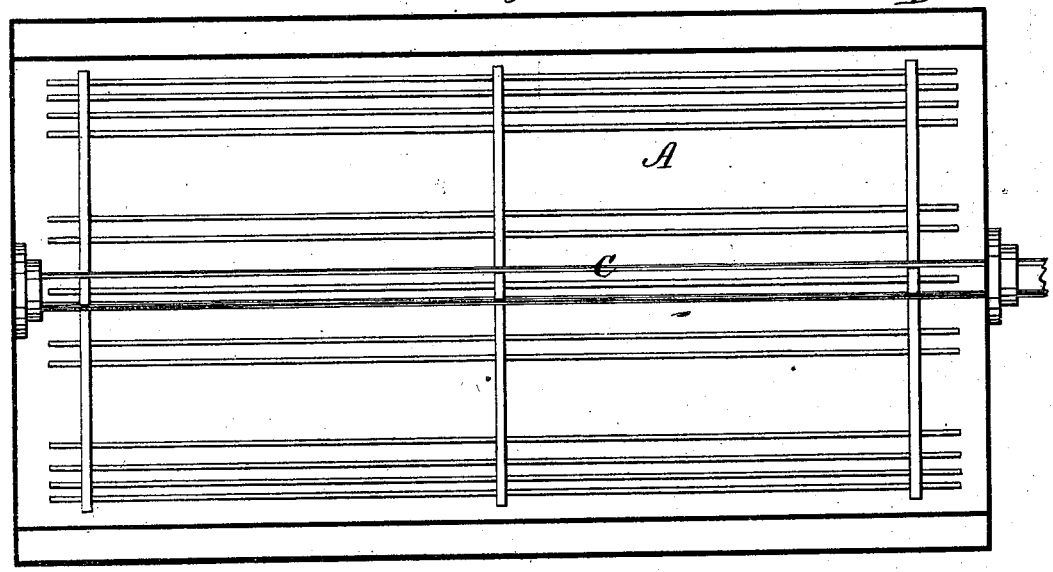

UNITED STATES PATENT OFFICE

NARCISSE PIGEON, OF BROOKLYN, NEW YORK.

IMPROVEMENT IN PROCESSES FOR MANUFACTURING GLUCOSE.

Specification forming part of Letters Patent No. 203,935, dated May 21, 1878; application filed March 1, 1878.

*To all whom it may concern:*

Be it known that I, NARCISSE PIGEON, of Brooklyn, in the county of Kings and State of New York, have invented a new and improved process in the manufacture of corn-sirups, and in the production of corn-wort for use in beer-making, of which the following is a specification:

The object of the process, taken as a whole, is to obtain the maximum quantity of grape-sugar and the minimum quantity of dextrine from a given quantity of corn or starch, and at the same time to obtain economically, in the process of manufacture, the largest possible amount of extract or saccharine matter.

The first step of the process is to add a certain quantity of diastase to the corn-mash, either previously to heating or before the temperature has reached 125° Fahrenheit, chiefly to prevent thickening of the mash by its chemical action on the starchy and gummy matter, thereby promoting subsequent exfoliation. In other words, the diastase keeps the mash as thin and liquid as possible, and in better condition for ultimate conversion into saccharine matter. After diastase has been added the mash is heated, by use of a water-bath, up to 185° Fahrenheit, at which temperature the vegetable albumen begins to coagulate. The mash is then allowed to cool to 152° Fahrenheit, when another quantity of diastase is added, for the purpose of effecting perfect conversion of the starchy matter.

I show in accompanying drawing a vertical section, Figure 1, and plan view, Fig. 2, of a water-bath and mash-agitator which I employ in carrying out my process.

The process itself is as follows: The quantity of Indian corn or maize to be treated is reduced to meal by the ordinary grinding operation. The inner chamber A of the water-bath B is then filled with the requisite quantity of water. After the water has been heated up to about 120° or 125° Fahrenheit, the requisite quantity of meal is introduced and mixed with it. I then immediately introduce a portion of the aggregate quantity of malt I employ in the process.

The proportions, by weight, of water, meal, and malt are as follows, to wit: Water, four hundred to eight hundred parts; meal, one hundred parts; malt, fifteen parts—that is to say, the quantity of water may be varied according to the desired sweetness or consistency of the sirup or wort to be produced; and, in the first stage of the process above described, the proportion of malt used is five parts or pounds, the remaining ten parts being reserved for use in the second or last stage of the process, as hereinafter described.

At once the malt has been added to the mash, agitation of the latter is begun by means of the armed shaft C, and it is also heated gradually up to about 185° Fahrenheit, not, however, by direct application of heat, but indirectly by raising the temperature of water-bath A to 195° Fahrenheit, beyond which degree it should never be carried. The mash is next cooled to 152° Fahrenheit, either naturally or by introduction of cold water into the water-bath, and continued agitation. I then add the residue of the malt, to wit, ten parts, (or more,) by weight, to one hundred parts of the meal, and keep up the agitation for one-half hour, the bath being at the same time kept covered. The mash is next allowed to stand one-half hour, and again agitated a few minutes. It then stands another hour for the purpose of facilitating saccharization. During all this time the mash is maintained at 152° Fahrenheit, or thereabout. After the mash has been thus alternately agitated and allowed to stand quiescent, its temperature is raised to 172° or 175° Fahrenheit by raising the heat of the water in the jacket of the water-bath. After the degree of 172° or 175° Fahrenheit has been reached, steam is utilized for raising the temperature to 185° Fahrenheit, or even 190° Fahrenheit.

Throughout the process the temperature of the mash is never raised above 185° Fahrenheit, and hence the water in the jacket B is never raised above 195° Fahrenheit, or thereabout, this being the indispensable condition of the desired measure of success, since a degree of heat above 185° Fahrenheit will coagulate the vegetable albumen. It is equally indispensable that the mash shall not be subjected to steam-heat or equivalent while its temperature is below 172° or 175° Fahrenheit; but when it has reached that point, it is then safe and practicable to employ steam-heat, which is, however, done only to save time, by quickly raising the mash to 185° Fahrenheit.

The steam-heat may be applied by means of a coil of steam-pipe in the chamber A of the water-bath, or directly to the water-bath B.

By means of the water-bath the heat is applied gently, and gradually increased to the required degree, so that the albumen of the grain particles is not coagulated, as it would be if a high heat were applied. Such coagulation will prevent rupture of the starch-cells and the desired exfoliation, and, since exfoliation is the necessary precedent of saccharization, it results that when such coagulation takes place the ultimate effect will be the extraction of but a small per cent. of saccharine matter. The most important condition of success is, however, the fractioning of the malt—that is to say, its application in the first stage of the process, and also in the second or last stage. By adding the malt to the mash in small quantity at first and a larger quantity subsequently, it produces a widely-different effect than when applied all at one time.

By my process it is practicable to obtain at least seventeen per cent. of dry extract or saccharine matter.

After the completion of the process as above described, I filter the liquor through a mash-tun having a false bottom, arranged as charcoal-filters are in sugar-refineries, and spray the residuum with hot water for complete extraction. The sirup or sweet liquor thus obtained is then evaporated in vacuum-pan to the desired consistency for use as wort. For table use, I concentrate the liquor in a vacuum-pan to 20° to 30° Baumé; then defecate with blood or other means; next filter through bag-filter and through bone-black, as practiced in sugar-refineries. The sirup thus produced I concentrate to 40° or 42° Baumé, and mix it with an equal quantity of cane-sugar sirup.

It is scarcely necessary to state that I do not claim the conversion of starchy matter into grape-sugar by use of diastase; and I am also aware that Payen, the French chemist, has produced, by diastase, a sirup containing a somewhat large percentage of grape-sugar; but the solution was in such a diluted state that the process was impracticable, the starch being one-fortieth of the water used.

What I claim is—

The process herein described for extracting grape-sugar from maize or Indian corn, consisting in the following steps, to wit: slowly heating the corn-mash to 185° Fahrenheit, or thereabout; second, adding a per cent. of malt in the first stage of the process, before the temperature of the mash has reached 125° Fahrenheit; third, adding another per cent. of malt in the second or last stage of the process—that is to say, after the mash has cooled to 152° Fahrenheit, or thereabout; fourth, filtering the mash and concentrating the product by evaporation, as set forth.

NARCISSE PIGEON.

Witnesses:
JAMES T. GRAHAM,
C. SEDGWICK.